Nov. 28, 1939.   S. B. KURZINA, JR   2,181,242
FREEWHEELING DRIVE
Filed April 10, 1937
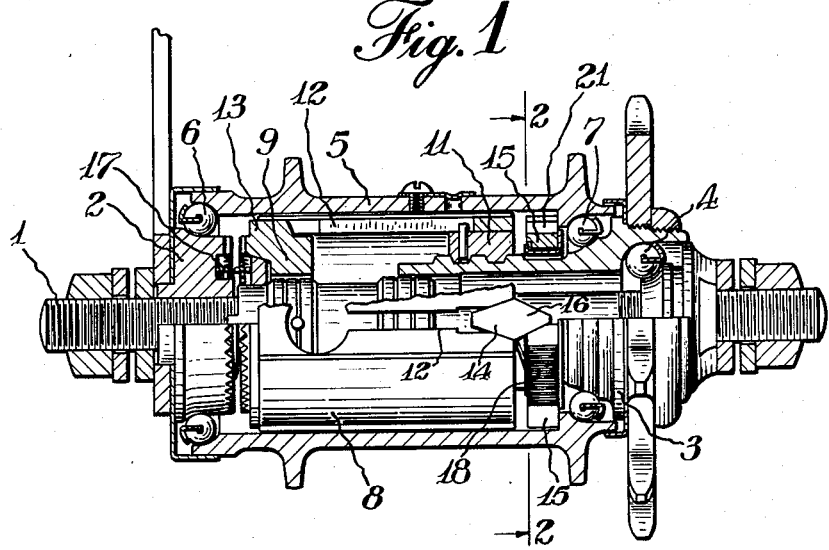
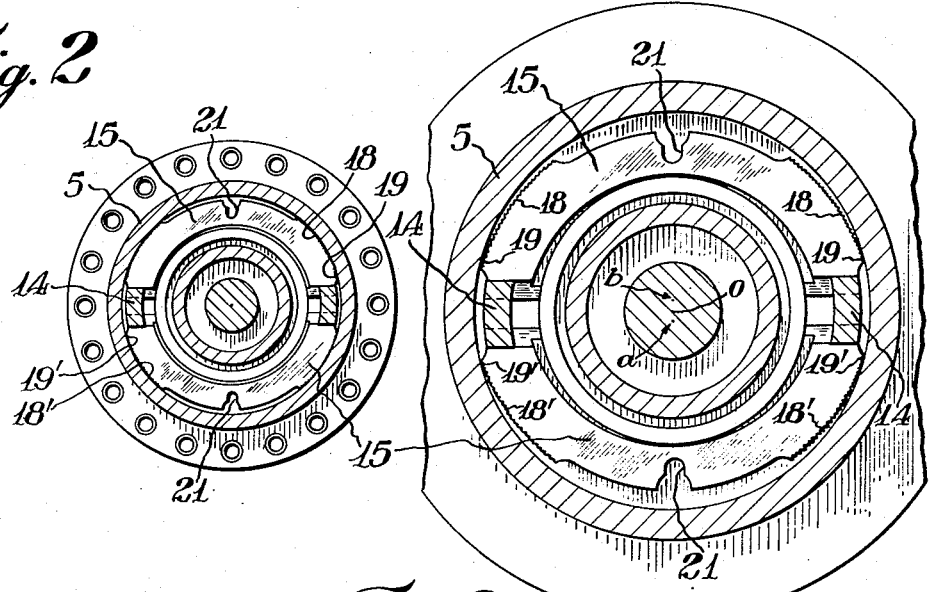
INVENTOR.
Stanley B. Kurzina Jr.
BY
ATTORNEY.
Witness:

Patented Nov. 28, 1939

2,181,242

UNITED STATES PATENT OFFICE 2,181,242

FREEWHEELING DRIVE

Stanley B. Kurzina, Jr., Elmira, N. Y., assignor, by mesne assignments, to Bendix Aviation Corporation, South Bend, Ind., a corporation of Delaware Application April 10, 1937, Serial No. 136,160

4 Claims. (Cl. 192—64)

The present invention relates to freewheeling drives such as coaster brakes for bicycles and the like, and more particularly to the forward driving means thereof.

In the commercial type of bicycle coaster brake known as the "Morrow" brake, which is constructed substantially in accordance with the teachings of the patent to Morrow 906,149, patented December 8, 1908, the forward drive is accomplished by means of a pair of substantially semi-cylindrical clutch shoes which are expanded into engagement with the interior surface of the hub. It is desirable that this engagement be such as to cause a positive drive without slippage under all conditions of lubrication, and at the same time the expansive forces on the clutch shoes should not be great enough to endanger the integrity of the hub even under shock loads such as may be caused by sudden and violent applications of driving effort.

It is an object of the present invention to provide a novel driving clutch for coaster brakes which is efficient and reliable in normal operation, while being protected against disruptive effects due to overloads.

It is another object to provide such a device which is self-adjusting in character so as to increase the effectiveness of the initial application of driving effort thereto, but to reduce the bursting forces generated by heavy driving stresses.

It is a further object to provide such a device which is readily adaptable to secure any desired mode of operation within said limits.

Further objects and advantages will be apparent from the following description taken in connection with the accompanying drawing in which:

Fig. 1 is a side elevation partly in section and partly broken away of a coaster brake embodying a preferred form of the present invention;

Fig. 2 is a section taken substantially on the line 2—2 of Fig. 1 showing the driving clutch in engaged position; and Fig. 3 is a view similar to Fig. 1 on an enlarged scale showing the driving clutch in disengaged position.

Referring first to Fig. 1 of the drawing, a coaster brake of the conventional "Morrow" type is illustrated comprising an axle shaft 1 carrying an anchor member 2, and a drive member 3 journalled on the shaft as by means of a bearing 4. A hub 5 formed interiorly as a smooth cylinder for the majority of its length is journalled on the anchor member 2 by means of a bearing 6 and on the drive member 3 by means of a bearing 7. A brake member in the form of an expansible cylinder 8 is mounted at one end on a clutch member 9 loosely mounted on the axle 1, and at its other end on a nut member 11 threaded on an extended portion of the drive member 3. The brake cylinder 8 is rendered expansible by means of longitudinal slots 12 extending throughout most of its length, a pair of such slots entering each end of the brake, the pairs being arranged in staggered overlapping relationship spaced substantially 90 degrees from each other about the brake sleeve. Clutch member 9 and nut 11 are provided with wedge lugs 13 and 14 respectively arranged to enter the tapered ends of said slots and expand the brake when the nut is moved toward the clutch member, at which time the clutch member 9 is moved into engagement with the anchor member 2 so as to render the brake sleeve immovable.

Forward driving of the hub 5 from the drive member 3 is accomplished by means of a pair of semi-cylindrical clutch shoes 15, the ends of which are spaced slightly and beveled laterally to accommodate the forward driving portions 16 of the lugs 14 on nut 11.

In the operation of the device as so far described, backward rotation of the drive member 3 threads the nut 11 to the left thereon whereby the brake cylinder 8 and clutch member 9 are moved to the left, the clutch member thus engaging the anchor member 2, and thereafter further motion of the nut 11 causes the lugs 13 and 14 of the clutch member 9 and nut 11 to enter the slots 12 of the brake cylinder and expand the same into engagement with the interior of the hub 5, thus retarding the rotation thereof. Forward rotation of the drive member 3 causes the nut 11 to be traversed to the right in Fig. 1 whereby the portions 16 of the lugs 14 thereon wedge the drive clutch shoes 15 apart and cause them to clutch the interior of the hub 5 whereby rotation of the drive member and nut is transmitted through the clutch shoes 15 to the hub. At this time, the brake sleeve 8 is free to rotate since the clutch member 9 is maintained out of engagement with the anchor member 2 by means of a spring 17.

In the commercial operation of devices of this character in which the clutch shoes 15 are formed to substantially fit the interior of the hub, it has been found that under certain conditions of lubrication of the members and other factors conducive thereto, there is a tendency for the clutch shoes 15 to fail to effectively engage the hub 5, whereby rotation of the drive member 3 is not transmitted to the hub. According to the present invention, slipping of the clutch shoes 15 is prevented by so forming said clutch shoes that they initially engage the inner periphery of the hub adjacent their extremities, thus setting up a wedging action between the shoes and the hub which is very effective in preventing slipping under all conditions, and controlling the wedging action so as to limit the expansive force thereof to prevent disruptive effects on the hub.

As best shown in Fig. 3 of the drawing, the wedging engagement of the clutch shoes 15 in the hub 5 is brought about by forming the external surfaces of the clutch shoes with a greater radius than the interior radius of the hub. Thus whereas the center of the hub is indicated at o, the clutching surfaces 18 are formed substantially about the point a as a center, and the surfaces 18' are formed substantially about the center b. The outer ends 19 and 19' thus initially engage the interior of the hub 5, causing the clutch shoes 15 to wedge in the hub and break down any oil film between the clutching surfaces. The breaking down of the oil film may further be facilitated by grooving or knurling the clutching surfaces as illustrated.

In order to limit the wedging action of the clutch shoes in the hub, notches 21 are formed in the intermediate portions thereof, thus providing a certain amount of elasticity which enables the clutch shoes to conform themselves to the interior surface of the hub under the pressures exerted by the wedging lugs 14 of the nut 11. It will be understood that in Fig. 3 the eccentricity of the clutch surfaces is considerably exaggerated for the purposes of illustration.

In the operation of the forward drive as herein disclosed, expansion of the clutch shoes 15 by means of the wedges 14 on the nut 11 causes the ends 19, 19' of the clutching surfaces to initially engage the interior of the hub and wedge therein. Increasing driving force applied through the drive member 3 causes further expansion of the clutch shoes 15 whereby they are gradually deformed, thus bringing more and more of the clutching surfaces 18, 18' into engagement with the hub 5. It will be obvious that as the more central portions of the clutching surfaces engage the hub, as shown in Fig. 2, the wedging effect is lessened until the thrust from the wedging elements 14 becomes so nearly radial to the hub that further increases in driving effort do not unduly stress the hub. It is thus possible to secure a very efficient initial clutching action while limiting the maximum clutching pressures to a safe value.

Although but one form of the invention has been shown and described in detail, it will be understood that other embodiments are possible and that various changes may be made in construction and arrangement of the parts without departing from the spirit of the invention as defined in the claims appended hereto.

What is claimed is:

1. In a clutch drive for a coaster brake, a cylindrical driven member, a pair of substantially semi-cylindrical driving clutch members having roughened clutch surfaces adjacent their ends, said surfaces having a larger radius than the internal radius of the driven member, and means for rotating said driving members and wedging the ends thereof apart, the central portions of the driving members being of reduced cross section to render the same flexible so that increasing pressure on the driving members causes the area of the clutch surfaces in contact with the hub to extend gradually inward from the ends of the driving members.

2. In a clutch drive for a coaster brake, a hub having a cylindrical clutching surface, a pair of arcuate clutch members mounted therein having cylindrically curved clutch surfaces adjacent their ends of a radius slightly greater than that of the hub clutch surface, and means for rotating the clutch members and wedging the ends thereof apart, the central portions of the clutch members being of reduced cross-section to render the same slightly flexible so that as the clutch members are expanded against the interior of the hub, the contacting areas of the clutch members extend gradually inward from the ends thereof.

3. In a coaster brake for bicycles and the like a cylindrical hub, arcuate driving clutch members mounted therein, and means interposed between the ends of the clutch members for expanding such clutch members into driving engagement with the hub, said clutch members being formed with rigid contact portions to initially engage the hub with small areas of contact and provided with flexible portions to permit complete engagement of said rigid contact portions with the hub upon further application of said expanding means.

4. In a coaster brake for bicycles and the like a cylindrical hub, arcuate driving clutch members formed with rigid ends mounted within the hub, said ends constituting cylindrical clutch surfaces of a radius slightly greater than that of the cylindrical hub, and means interposed between the ends of the clutch members for expanding and wedging the ends of said clutch members into driving engagement with the hub, said clutch members being also provided with flexible portions to permit further engagement of the clutch members with the hub upon further application of the expanding means.

STANLEY B. KURZINA, JR.